(12) United States Patent  
Hsieh et al.

(10) Patent No.: US 9,632,324 B2  
(45) Date of Patent: Apr. 25, 2017

(54) AUTOSTEREOSCOPIC DISPLAY PANEL, ALIGNMENT METHOD, AND AUTOSTEREOSCOPIC DISPLAY METHOD THEREOF

(71) Applicant: CHUNGHWA PICTURE TUBES, LTD., Taoyuan (TW)

(72) Inventors: Yung-Yu Hsieh, Yunlin County (TW); Jhen-Shen Liao, Taoyuan County (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 469 days.

(21) Appl. No.: 14/141,445

(22) Filed: Dec. 27, 2013

(65) Prior Publication Data

US 2015/0062312 A1    Mar. 5, 2015

(30) Foreign Application Priority Data

Aug. 29, 2013   (TW) .............................. 102131077 A (51) Int. Cl.
| | |
|---|---|
| G02B 27/22 | (2006.01) |
| G02B 27/00 | (2006.01) |
| H04N 13/04 | (2006.01) |
| G02B 26/02 | (2006.01) |

(52) U.S. Cl.  
CPC ..... G02B 27/2214 (2013.01); G02B 27/0093 (2013.01); H04N 13/0409 (2013.01); H04N 13/0468 (2013.01); G02B 26/02 (2013.01)

(58) Field of Classification Search  
CPC ............ G02B 27/2214; G02B 27/0093; H04N 13/0409; H04N 13/0468

USPC ....................................................... 348/45, 54  
See application file for complete search history.

(56) References Cited

U.S. PATENT DOCUMENTS

| | | | | |
|---|---|---|---|---|
| 8,199,173 | B2 * | 6/2012 | Iriguchi | G09G 3/003 345/32 |
| 2007/0120768 | A1 * | 5/2007 | Lee | H04N 13/0413 345/60 |
| 2013/0257925 | A1 * | 10/2013 | Kim | H04N 13/0434 345/691 |
| 2014/0192172 | A1 * | 7/2014 | Kang | G02B 27/2214 348/55 |

FOREIGN PATENT DOCUMENTS

| | | |
|---|---|---|
| CN | 101604091 A | 12/2009 |
| CN | 101923257 A | 12/2010 |

(Continued)

*Primary Examiner* — Gims Philippe  
*Assistant Examiner* — Joseph Becker  
(74) *Attorney, Agent, or Firm* — CKC & Partners Co., Ltd.

(57) ABSTRACT

An autostereoscopic display panel includes a display panel and a barrier panel adjacent to each other. The display panel includes a plurality of pixel units. Each of the pixel units includes a plurality of sub-pixels arranged along a first direction, such that each of the pixel units has a pixel width along the first direction. The barrier panel includes a plurality of barrier units. Each of the barrier units includes at least three barrier electrodes parallel to each other. Each of the barrier electrodes has an electrode width along the first direction, and the electrode width is smaller than the pixel width. An alignment method and an autostereoscopic display method using the autostereoscopic display panel are also disclosed.

4 Claims, 7 Drawing Sheets

(56) References Cited

FOREIGN PATENT DOCUMENTS

| | | |
|---|---|---|
| CN | 101957523 A | 1/2011 |
| CN | 102662283 A | 9/2012 |
| CN | 103163650 A | 6/2013 |
| JP | 2009136355 A | 6/2009 |
| JP | 2013024957 A | 2/2013 |
| TW | 200834118 | 8/2008 |
| TW | 201205118 | 2/2012 |
| TW | 201209448 | 3/2012 |
| TW | 201229982 A | 7/2012 |
| TW | 201321796 A | 6/2013 |

\* cited by examiner

AUTOSTEREOSCOPIC DISPLAY PANEL, ALIGNMENT METHOD, AND AUTOSTEREOSCOPIC DISPLAY METHOD THEREOF

RELATED APPLICATIONS

This application claims priority to Taiwanese Application Serial Number 102131077, filed Aug. 29, 2013, which is herein incorporated by reference.

BACKGROUND

Field of Invention

The present invention relates to an autostereoscopic display panel.

Description of Related Art

As one type of autostereoscopic technologies, active parallax barrier technique provides stereoscopic images by forming parallax barriers on the display panel to distinguish the left- and right-eye images. The parallax barriers can be formed by providing different signals to the stripe-shaped barrier electrodes. However, since the barrier electrodes can distinguish the left- and right-eye images at different views by blocking specific pixels, the alignment between the barrier electrodes and the pixels is important. If there is an alignment shift between the barrier electrodes and the pixels, the stereoscopic images may have color cast and crosstalk problems. Moreover, according to the configuration of the barrier electrodes, the views of the autostereoscopic technology has its spatial limit, and, therefore, the spatial range of the stereoscopic image which an observer can experience is also limited.

SUMMARY

An aspect of the present invention is to provide an autostereoscopic display panel including a display panel and a barrier panel. The display panel includes a plurality of pixel units arranged along a first direction and a second direction perpendicular to the first direction for forming a pixel unit array. Each of the pixel units includes a plurality of sub-pixels arranged along the first direction, and each of the pixel units has a pixel width along the first direction. The barrier panel is disposed adjacent to the display panel. The barrier panel includes a first substrate, a second substrate, a liquid crystal layer, a plurality of barrier units, and an electrode layer. The liquid crystal layer is disposed between the first substrate and the second substrate. The barrier units are respectively disposed between the first substrate and the liquid crystal layer. Each of the barrier units includes at least three barrier electrodes parallel to each other. Each of the barrier electrodes has an electrode width along the first direction, and the electrode width is smaller than the pixel width. The electrode layer is disposed between the second substrate and the liquid crystal layer.

In one embodiment of the present invention, each of the barrier units has a barrier width along the first direction, and the autostereoscopic display panel is designed according to the following equation:

BW=$K$*PW; and $K$>0, wherein BW is the barrier width, K is a scan rate of the autostereoscopic display panel, and PW is the pixel width.

In one embodiment of the present invention, the autostereoscopic display panel further includes a plurality of signal sources. Each of the signal sources is connected to one of the barrier electrodes of each of the barrier units for providing signals to the barrier electrodes, respectively.

In one embodiment of the present invention, each of the barrier units has at least one block unit and at least one transparent unit. The block unit and the transparent unit are alternatingly arranged. The signal received by the block unit is different from the signal received by the transparent unit when the autostereoscopic display panel is in a stereoscopic display state.

In one embodiment of the present invention, a number of the barrier electrodes of each of the block units is equal to a number of the barrier electrodes of each of the transparent units.

In one embodiment of the present invention, an angle is formed between an arrangement direction of the barrier electrodes and the first direction, and the angle is between 0 degree and 45 degrees.

Another aspect of the present invention is to provide an alignment method of an autostereoscopic display panel including the following steps:

A display panel and a barrier panel are adhered. The display panel includes a plurality of pixel units arranged along a first direction, the barrier panel includes a plurality of barrier units, and each of the barrier units includes at least three barrier electrodes. A position of a vertical projection of each of the pixel units on the barrier panel is determined. The position of the barrier units is maintained if the vertical projections overlap the barrier units. The position of the barrier units is adjusted to make the pixel units respectively overlap a block unit and a transparent unit of the barrier units if a displacement shift is formed between the vertical projections and the barrier units.

In one embodiment of the present invention, the step of adhering the display panel and the barrier panel further includes the following step:

The barrier panel is disposed on the display panel for forming an angle between an arrangement direction of the barrier electrodes and the first direction, wherein the angle is between 0 degree and 45 degrees.

Yet another aspect of the present invention is to provide an autostereoscopic display method of an autostereoscopic display panel including the following steps:

A relative position between two eyes of an observer and the autostereoscopic display panel is detected. The autostereoscopic display panel includes a display panel and a barrier panel adjacent to each other. The display panel includes a plurality of pixel units, and each of the pixel units includes a plurality of sub-pixels. The barrier panel includes a plurality of barrier units, and each of the barrier units includes at least three barrier electrodes. Each of the barrier units is divided into at least one block unit and at least one transparent unit according to the relative position. The block unit and the transparent unit are alternatingly arranged. Signals are provided to the block unit and the transparent unit, respectively, such that the signal received by the block unit is different from the signal received by the transparent unit when the autostereoscopic display panel is in a stereoscopic display state.

In one embodiment of the present invention, the method further includes the following steps:

A vertical position between two eyes of the observer and the autostereoscopic display panel is detected. A number of the barrier electrodes of the block unit and a number of the barrier electrodes of the transparent unit are determined according to the vertical position.

In one embodiment of the present invention, the method further includes the following steps:

A horizontal position between two eyes of the observer and the autostereoscopic display panel is detected. A relative displacement between vertical projections of the sub-pixels on the barrier panel and the block unit and the transparent unit is determined according to the horizontal position.

The alignment between the pixel units and the barrier electrodes is improved due to the configuration of the barrier electrodes of the autostereoscopic display panel mentioned above. In addition, the autostereoscopic display panel mentioned above can alter the signals between the barrier electrodes by detecting the position of the observer, such that the observer can experience stereoscopic images when the observer is located at different positions.

DETAILED DESCRIPTION

Figure 1:
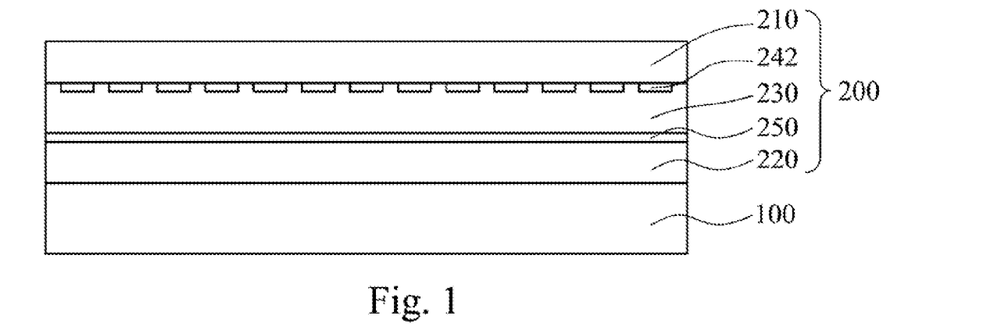
FIG. 1 is a side view of an autostereoscopic display panel according to one embodiment of the present invention.
Figure 2A:
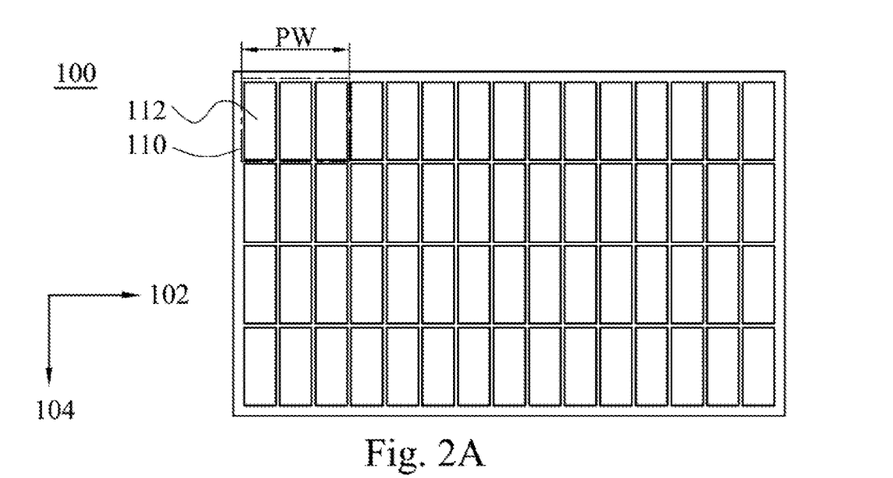
FIG. 2A is a top view of a display panel of FIG. 1.

Reference is made to FIG. 1 which is a side view of an autostereoscopic display panel according to one embodiment of the present invention. The autostereoscopic display panel includes a display panel 100 and a barrier panel 200 adjacent to each other. Reference is made to FIG. 2A which is a top view of the display panel 100 of FIG. 1. The display panel 100 includes a plurality of pixel units 110. Each of the pixel units 110 includes a plurality of sub-pixels 112. The sub-pixels 112 of each of the pixel units 110 can be corresponding to different color lights. The pixel units 110 are arranged along a first direction 102 and a second direction 104 perpendicular to the first direction 102 for forming a pixel unit array. The sub-pixels 112 are arranged along the first directions 102, and each of the pixel units 110 has a pixel width PW along the first direction 102.

Figure 2B:
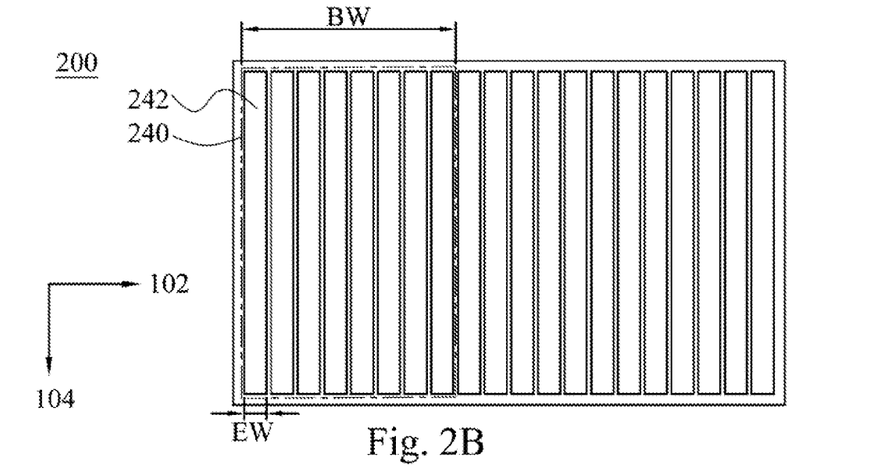
FIG. 2B is a top view of a barrier panel of FIG. 1.

FIG. 2B is a top view of the barrier panel 200 of FIG. 1. Reference is made to FIGS. 1 and 2B. The barrier panel 200 includes a first substrate 210, a second substrate 220, a liquid crystal layer 230, a plurality of barrier units 240, and an electrode layer 250. The liquid crystal layer 230 is disposed between the first substrate 210 and the second substrate 220. The barrier units 240 are respectively disposed between the first substrate 210 and the liquid crystal layer 230. Each of the barrier units 240 includes at least three barrier electrodes 242 substantially parallel to each other. Taking FIG. 2B as an example, each of the barrier units 240 includes eight barrier electrodes 242. Each of the barrier units 240 has a barrier width BW along the first direction 102, and each of the barrier electrodes 242 has an electrode width EW along the first direction 102. The electrode layer 250 is disposed between the second substrate 220 and the liquid crystal layer 230.

Reference is made to FIGS. 2A and 2B. The autostereoscopic display panel has a scan rate K, and K>0. The barrier width BW, the pixel width PW, and the scan rate K satisfy the equation: $BW=K*PW$, and the electrode width EW is smaller than the pixel width PW. In this embodiment, each of the barrier units 240 includes eight barrier electrodes 242. In other words, each of the pixel units 110 is corresponding to four barrier electrodes 242. However, in other embodiments, each of the pixel units 110 may be corresponding to at least two barrier electrodes 242, and the scope of the present invention is not limited to this respect. The configuration mentioned above is helpful to align the barrier units 240 to the pixel units 110, and is also helpful to provide stereoscopic images to different observers at different places (both be described following).

It should be noted that the display panel 100 mentioned above can be any display panel having pixel units, such as liquid crystal display panel, electroluminescence display panel, electrowetting display panel, or electrophoresis display panel. Moreover, the electrode layer 250 of FIG. 1 may be a layer or stripes, and the scope of the present invention is not limited to this respect. The electrode layer 250 can be configured as barrier electrodes corresponding to another viewing direction of the autostereoscopic display panel if the electrode layer 250 is stripes.

Figure 3:
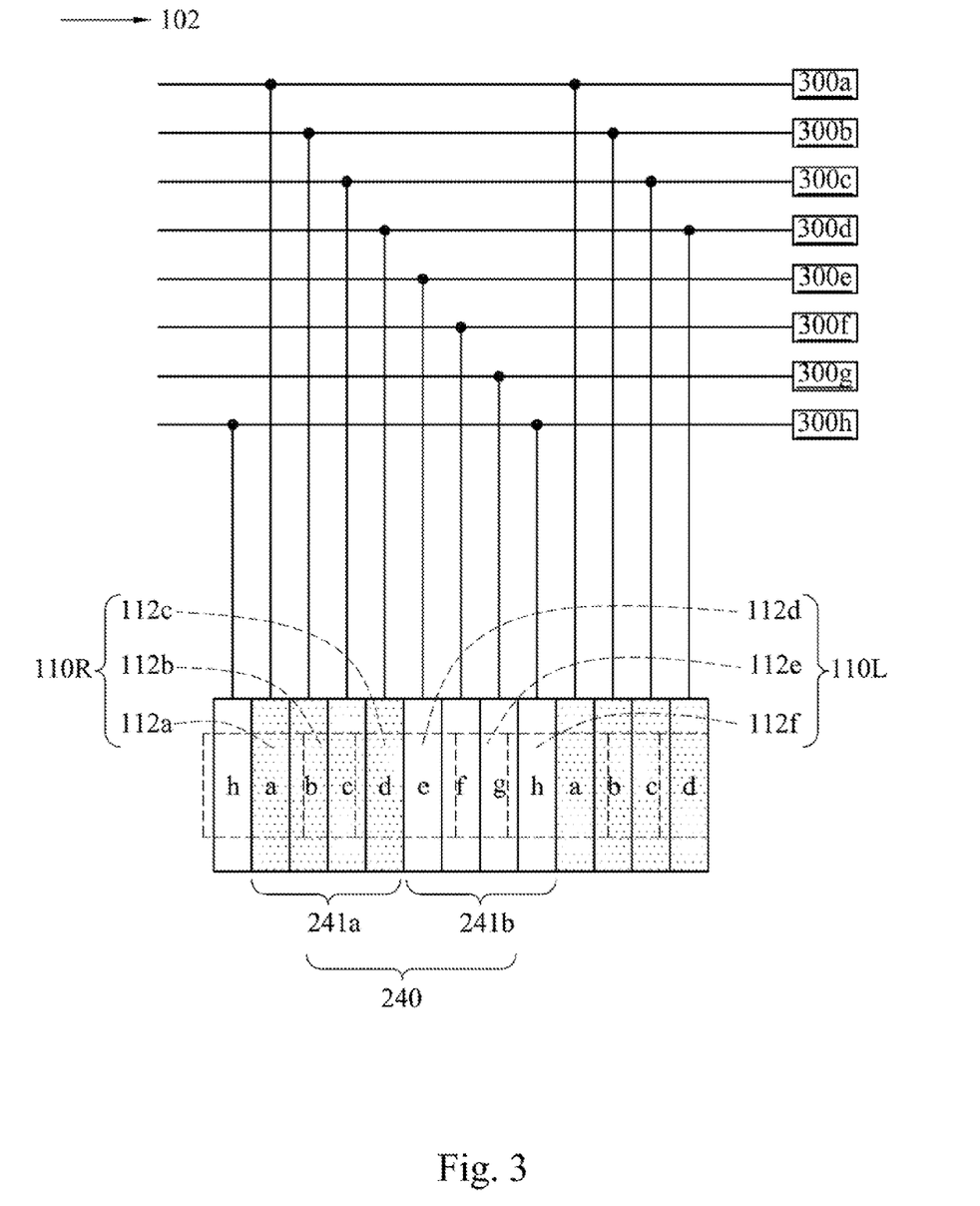
FIG. 3 is a local top view of the autostereoscopic display panel of FIG. 1 in a stereoscopic display state.

Reference is made to FIG. 3 which is a local top view of the autostereoscopic display panel of FIG. 1 in a stereoscopic display state. It should be noted that, for clarity, only single row of the sub-pixels are shown in FIG. 3. In greater detail, in this embodiment, the display panel 100 (see FIG. 2A) can include a plurality of pixel units 110R and 110L alternatingly arranged along the first direction 102. The pixel unit 110R, which may be a right-eye pixel unit, is composed by the sub-pixels 112a, 112b, and 112c. The pixel unit 110L, which may be a left-eye pixel unit, is composed by the sub-pixels 112d, 112e, and 112f, and the scope of the present invention is not limited to this respect. The sub-pixels 112a and 112d can be red sub-pixels, the sub-pixels 112b and 112e can be green sub-pixels, and the sub-pixels 112c and 112f can be blue sub-pixels. Moreover, the barrier panel 200 (see FIG. 2B) can include a plurality of barrier units 240 arranged along the first direction 102.

In this embodiment, the autostereoscopic display panel can further include a plurality of signal sources 300a~300h. Each of the signal sources is connected to one of the barrier electrodes of each of the barrier units 240 for providing signals to the barrier electrodes, respectively. Taking FIG. 3 as an example, the signal source 300a is connected to the barrier electrode a of each of the barrier units 240, the signal source 300b is connected to the barrier electrode b of each of the barrier units 240, and so on. Therefore, for each of the barrier units 240 in the stereoscopic display state, each of the barrier electrodes can individually receive different signals. For different barrier units 240 in the stereoscopic display state, the barrier electrodes connected to the same signal source can receive the same signal.

In this embodiment, each of the barrier units 240 has at least one block unit 241a and at least one transparent unit 241b. The block unit 241a and the transparent unit 241b are alternatingly arranged. The number of the barrier electrodes of the block unit 241a can be equal to the number of the barrier electrodes of the transparent unit 241b. However, in other embodiments, the number of the barrier electrodes of the block unit 241a and the number of the barrier electrodes of the transparent unit 241b can be different according to different configurations. In the stereoscopic display state, the signal received by the block unit 241a is different from the signal received by the transparent unit 241b. Taking FIG. 3 as an example, the barrier electrodes a~d compose the block unit 241a, and the barrier electrodes e~h compose the transparent unit 241b. The block unit 241a overlaps the pixel unit 110R along a vertical direction, and the transparent unit 241b overlaps the pixel unit 110L along the vertical direction. If an observer uses his or her left eye to see the pixel unit 110L through the transparent unit 241b normally, the observer can use his or her right eye to see the pixel unit 110R through the transparent unit 241b obliquely. Therefore, the observer can experience the stereoscopic image.

Reference is made to FIGS. 1 and 3. When the autostereoscopic display panel is in the stereoscopic display state, the signal sources 300a~300d can respectively provide block signals to the barrier electrodes a~d, and the electrode layer 250 can be provided a common voltage. Therefore, a voltage difference is existed between the barrier electrodes ad and the electrode layer 250, such that a portion of the liquid crystal layer 230 corresponding to the block unit 241a can block light. In addition, the signal sources 300e~300h can respectively provide transparent signals to the barrier electrodes e~h. Therefore, another voltage difference (or zero voltage difference) is existed between the barrier electrodes e~h and the electrode layer 250, such that light can pass through a portion of the liquid crystal layer 230 corresponding to the transparent unit 241b. It should be noted that the numbers of the block unit 241a and the transparent unit 241b mentioned above is illustrative only, and the scope of the present invention is not limited to this respect.

Figure 4:
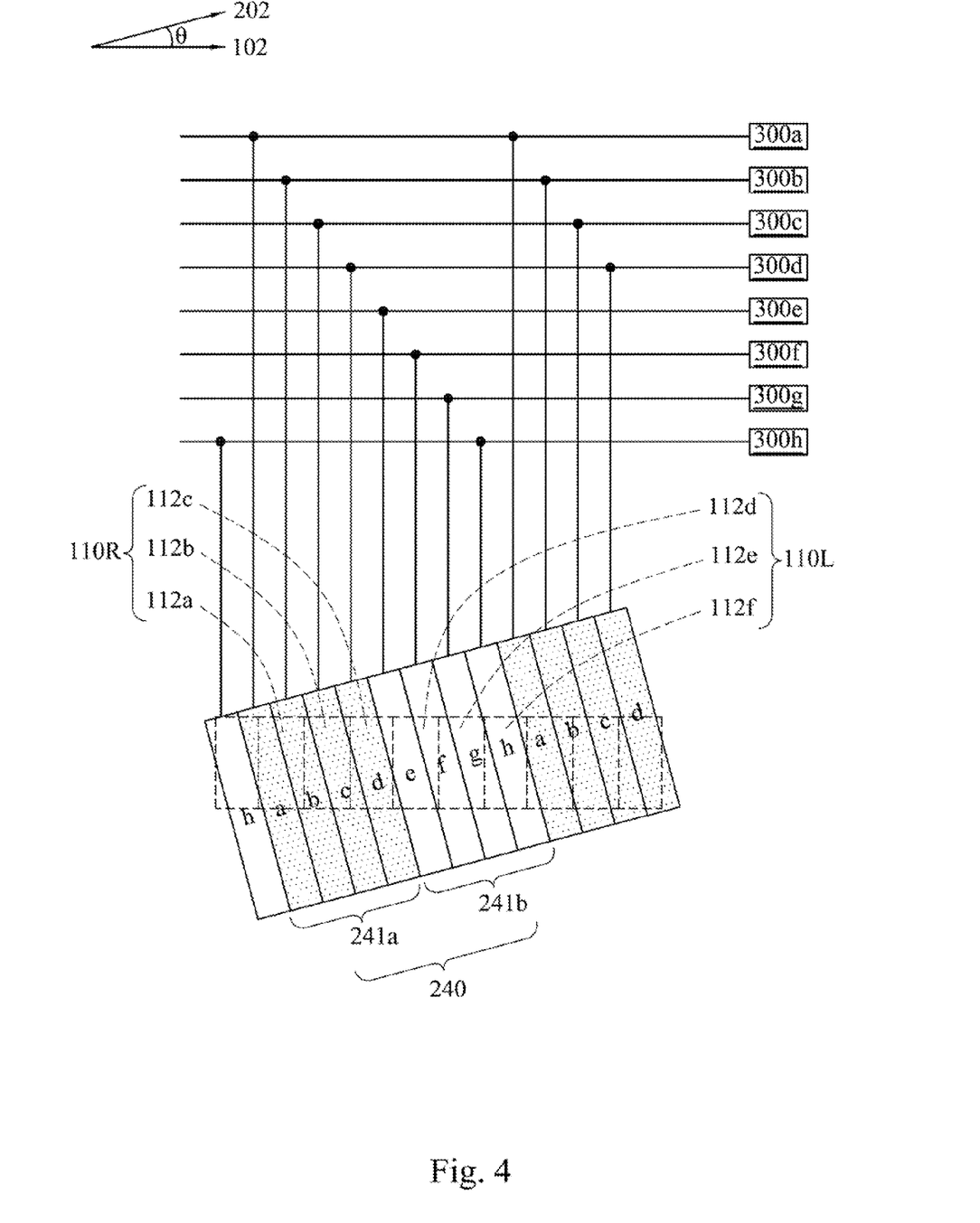
FIG. 4 is a local top view of the autostereoscopic display panel in the stereoscopic display state according to another embodiment of the present invention.

Reference is made to FIG. 4 which is a local top view of the autostereoscopic display panel in the stereoscopic display state according to another embodiment of the present invention. The difference between this embodiment and the embodiment of FIG. 3 is the arrangement direction of the barrier electrodes a~h. In this embodiment, the barrier electrodes a~h are arranged along an arrangement direction 202. An angle θ is formed between the arrangement direction 202 and the first direction 102, and the angle θ is between 0 degree and 45 degrees. The configuration mentioned above can prevent the Moiré effect, such that the quality of the stereoscopic image can be improved. In this embodiment, the block unit 241a overlaps the pixel unit 110R along the vertical direction, and the transparent unit 241b overlaps the pixel unit 110L along the vertical direction, such that the left and right eyes of the observer can respectively see the pixel units 110L and 110R through the transparent unit 241b to experience the stereoscopic image. Other relevant structural details of this embodiment are all the same as the embodiment of FIG. 3, and, therefore, a description in this regard will not be repeated hereinafter.

Figure 5:
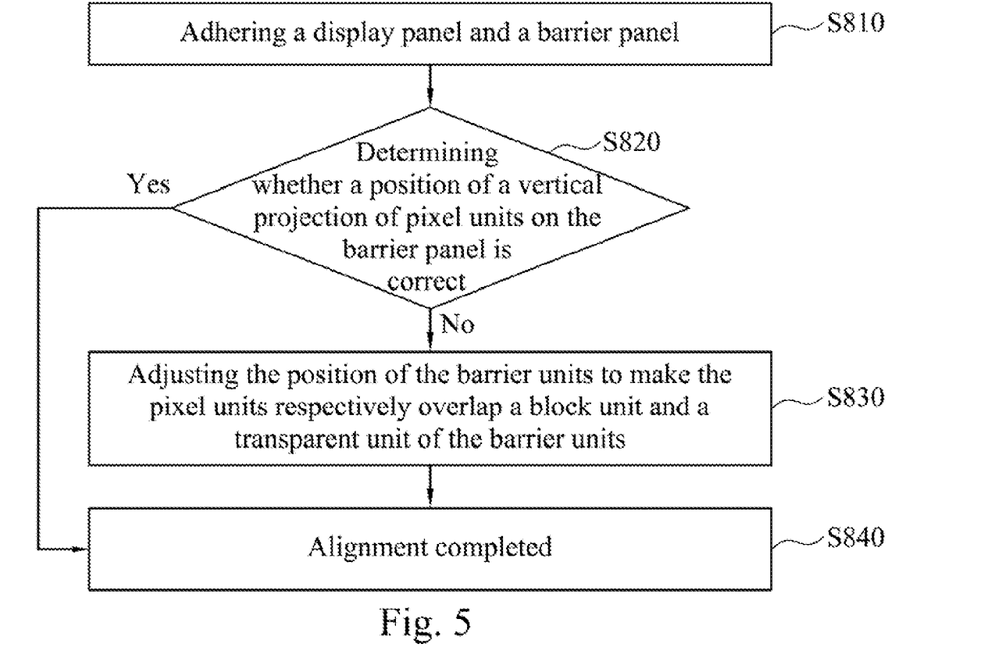
FIG. 5 is a flowchart of an alignment method applied to the autostereoscopic display panel of FIG. 1.

The following paragraphs provide detailed explanations with respect to an alignment method of the autostereoscopic display panel mentioned above. FIG. 5 is a flowchart of the alignment method applied to the autostereoscopic display panel of FIG. 1. Reference is made to FIGS. 1 and 5. Firstly, as shown in step S810, the display panel 100 and the barrier panel 200 are adhered. It should be noted that the adhering step mentioned in S810 can be a step of the manufacturing process of the autostereoscopic display panel, or can be a step of the maintaining process of the autostereoscopic display panel, and the scope of the present invention is not limited to this respect. In addition, although the display panel 100 is adhered to one side of the second substrate 220 of the barrier panel 200 in FIG. 1, the display panel 100 may be adhered to one side of the first substrate 210 of the barrier panel 200 in other embodiments.

Figure 6A:
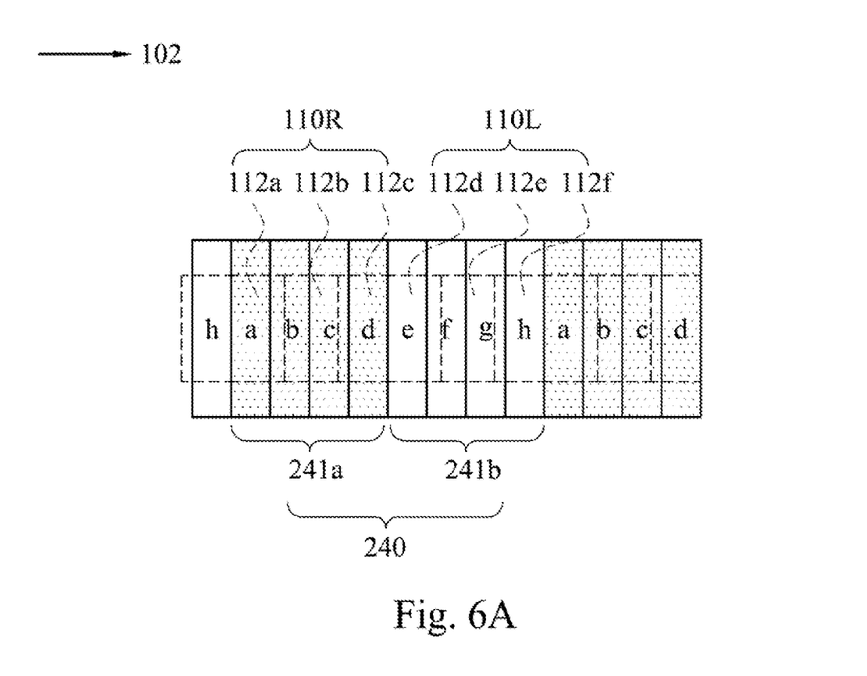
FIG. 6A is a local top view of the autostereoscopic display panel of FIG. 1.

FIG. 6A is a local top view of the autostereoscopic display panel of FIG. 1. Reference is made to FIGS. 5 and 6A. As shown in step S820, a position of a vertical projection of each of the pixel units 110R and 110L on the barrier panel 200 (see FIG. 1) is determined. Taking FIG. 6A as an example, after adhering, the pixel unit 110R overlaps the block unit 241a, i.e., the barrier electrodes a~d, and the pixel unit 110L overlaps the transparent unit 241b, i.e., the barrier electrodes e~h. It should be noted that "overlap" means, when the observer is in front of the autostereoscopic display panel, the left eye of the observer can observe that the block unit 241a substantially covers the pixel unit 110R, while the transparent unit 241b substantially covers the pixel unit 110L, and the right eye of the observer can observe the view opposite to the left eye.

Subsequently, as shown in step S840, if the vertical projection overlaps the barrier unit 240, the alignment is completed, i.e., the autostereoscopic display panel can maintain the position of the barrier unit 240. Taking FIG. 6A as an example, the pixel unit 110R overlaps the block unit 241a of the barrier unit 240, and the pixel unit 110L overlaps the transparent unit 241b of the barrier unit 240, i.e., the transparent unit 241b can expose the pixel unit 110L. In this situation, the autostereoscopic display panel can maintain the position of the barrier unit 240. If the observer uses his or her left eye to see the pixel unit 110L through the transparent unit 241b normally, the observer can use his or her right eye to see the pixel unit 110R through the transparent unit 241b obliquely. Therefore, the observer can experience the stereoscopic image.

Moreover, for the autostereoscopic display panel of FIG. 4, the barrier panel 200 (see FIG. 1) can be disposed on the display panel 100 (see FIG. 1) for forming the angle θ between the arrangement direction 202 of the barrier electrodes and the first direction 102 before the adhering process. As such, the vertical projections of the pixel units 110R and 110L on the barrier panel 200 can be basics to process the alignment. Other relevant alignment details of the embodiment of FIG. 4 are all the same as the step S840, and, therefore, a description in this regard will not be repeated hereinafter.

Figure 6B:
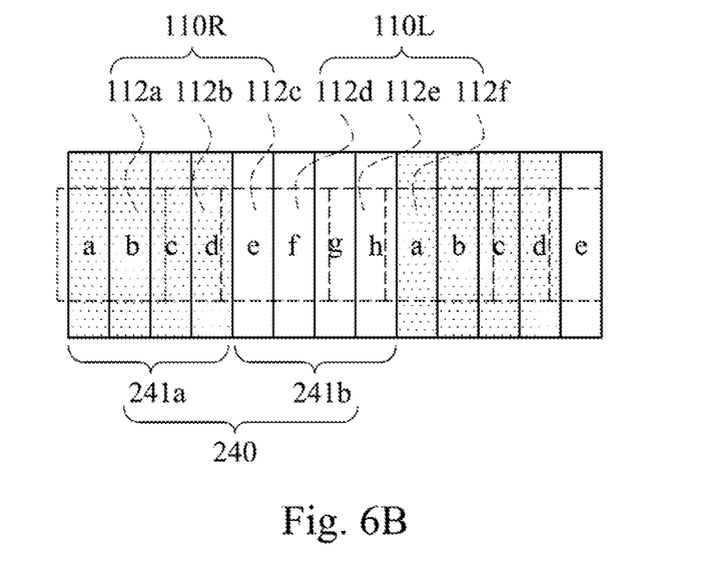
FIG. 6B is a local top view of the autostereoscopic display panel of FIG. 6A when there is an alignment shift.

FIG. 6B is a local top view of the autostereoscopic display panel of FIG. 6A when there is an alignment shift. Reference is made to FIGS. 5 and 6B. As shown in step S830, the position of the barrier units 240 is adjusted to make the pixel units respectively overlap the block unit 241a and the transparent unit 241b of the barrier unit 240 if a displacement shift is formed between the vertical projections and the barrier unit 240. In other words, if the displacement shift is formed, the block unit 241a and the transparent unit 241b can be adjusted according to the proper positions of the pixel units 110L and 110R relative to the barrier panel 200. In greater detail, in this embodiment, when the display panel 100 (see FIG. 1) is adhered to the barrier panel 200 (see FIG.

1), the transparent unit 241b may expose the sub-pixels 112c~112e, such that the stereoscopic image generated from the autostereoscopic display panel may have color cast or crosstalk. As such, after adhering, the signal source 300a (see FIG. 3) can provide the transparent signal rather than the block signal, and the signal source 300e (see FIG. 3) can provide the block signal rather than the transparent signal. Therefore, the block unit can include barrier electrodes b~e, whose positions overlap the pixel unit 110R, and the transparent unit can include barrier electrodes f~h, a, whose positions overlap the pixel unit 110L, and the color cast or crosstalk problems can be improved. Moreover, the alignment method can be applied to the autostereoscopic display panel of FIG. 4 if the autostereoscopic display of FIG. 4 has an alignment shift. A description of the alignment method applied to the autostereoscopic display of FIG. 4 will not be repeated hereinafter.

In summary, the autostereoscopic display panel of this embodiment can align the pixel units 110L and 110R corresponding to the barrier unit 240 (i.e., the block unit 241a and the transparent unit 241b) using the alignment method mentioned above. As such, the alignment shift issue can be improved, and the color cast or crosstalk of the stereoscopic image can also be improved.

Figure 7:
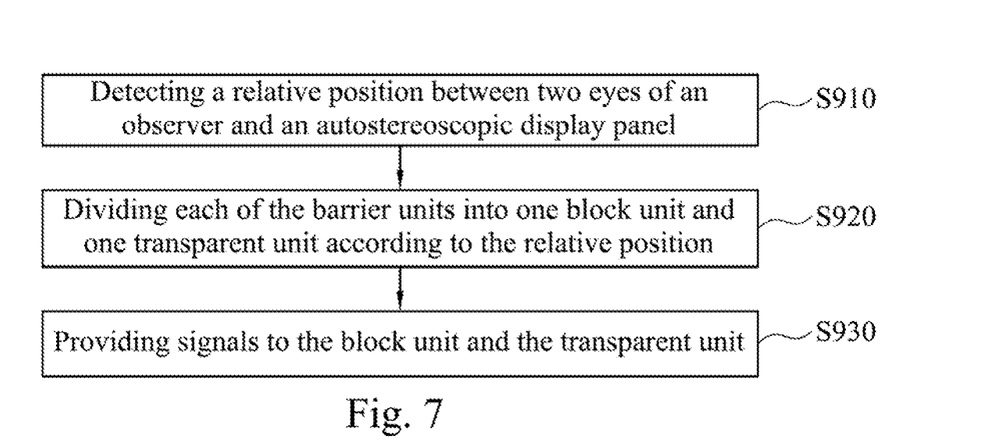
FIG. 7 is a flowchart of an autostereoscopic display method applied to the autostereoscopic display panel of FIG. 1.
Figure 8A:
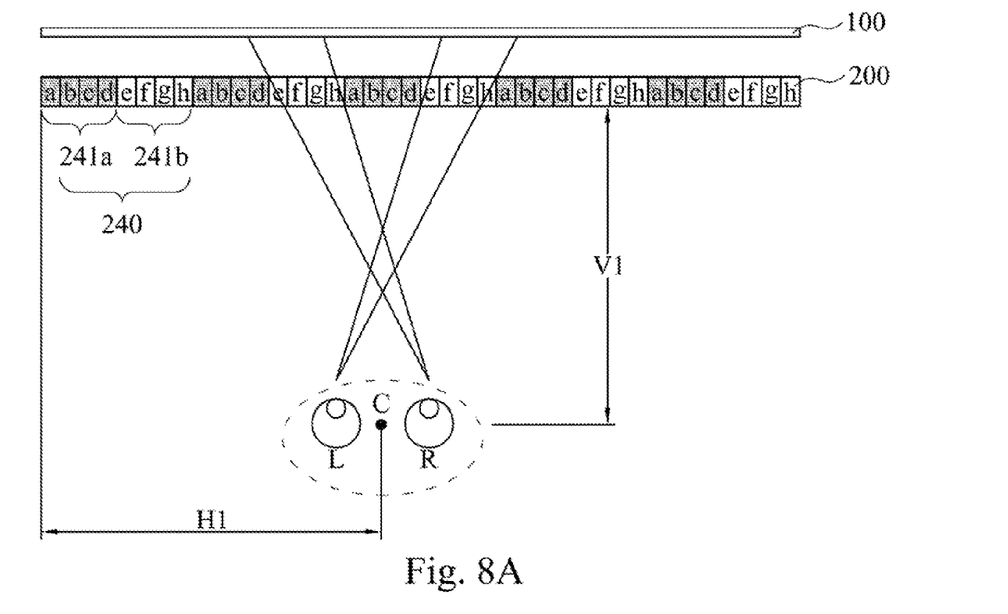
FIG. 8A is a schematic diagram of an observer located in front of the autostereoscopic display panel of FIG. 1.

FIG. 7 is a flowchart of an autostereoscopic display method applied to the autostereoscopic display panel of FIG. 1. FIG. 8A is a schematic diagram of the observer located in front of the autostereoscopic display panel of FIG. 1. For clarity, other elements of the barrier panel 200 are omitted except the barrier unit 240, i.e., the barrier electrodes a~h. Reference is made to FIGS. 7 and 8A. Firstly, as shown in step S910, a relative position between two eyes L and R of the observer and the autostereoscopic display panel is detected. Taking FIG. 8A as an example, the relative position includes a horizontal position H1 and a vertical position V1. The horizontal position H1 is between a center point C of two eyes L and R and an edge of the display panel 100, and the vertical position V1 is between two eyes L and R and the barrier panel 200. The definitions of the horizontal position H1 and the vertical position V1 are not limited to this respect. A person having ordinary skill in the art may select a proper measurement basic of the relative position according to real requirements. The detecting method may be achieved using a face detection system or a retina detection system, and the scope of the present invention is not limited to this respect.

Subsequently, as shown in step S920, each of the barrier units 240 is divided into at least one block unit 241a and at least one transparent unit 241b according to the relative position, i.e., the horizontal position H1 and the vertical position V1. The block unit 241a and the transparent unit 241b are alternatingly arranged. Taking FIG. 8A as an example, the block unit 241a is composed of the barrier electrodes a~d, and the transparent unit 241b is composed of the barrier electrodes e~h.

Next, as shown in step S930, signals are provided to the block unit 241a and the transparent unit 241b, respectively, such that the signal received by the block unit 241a is different from the signal received by the transparent unit 241b when the autostereoscopic display panel is in the stereoscopic display state. Taking FIG. 8A as an example, the block unit 241a can receive the block signal, such that the block unit 241a can block the light reaching the block unit 241a. Moreover, the transparent unit 241b can receive the transparent signal, such that the left eye L and the right eye R of the observer can see the pixel units corresponding to the left eye L and the right eye R through the transparent unit 241b, respectively, to experience the stereoscopic image.

Figure 8B:
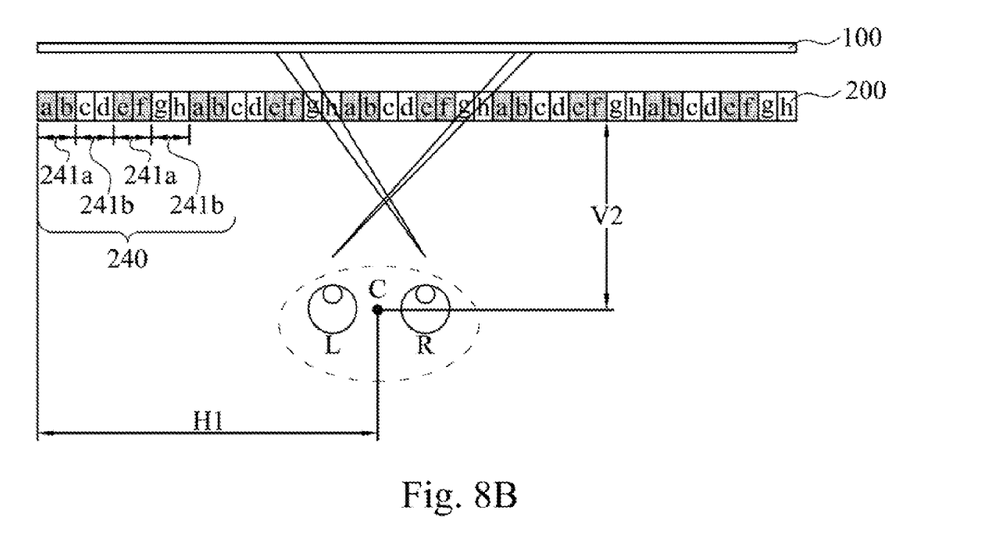
FIG. 8B is a schematic diagram of the observer located at another place in front of the autostereoscopic display panel of FIG. 1.

The following paragraphs provide detailed explanations with respect to how to adjust the signals of the barrier electrodes a~h to make the observer experience the stereoscopic image when the observer is located at different places. Reference is made to FIG. 8B which is a schematic diagram of the observer located at another place in front of the autostereoscopic display panel of FIG. 1. Firstly, the autostereoscopic display panel can detect the relative position between the two eyes L and R of the observer and the autostereoscopic display panel to get the horizontal position H1 and a vertical position V2. The vertical position V2 is shorter than the vertical position V1 in FIG. 8A. Therefore, in this embodiment, the number of the barrier electrodes of the block unit 241a and the number of the barrier electrodes of the transparent unit 241b can be determined according to the vertical position V2. Taking FIG. 8B as an example, each of the barrier units 240 includes two of the block units 241a and two of the transparent units 241b. Each of the two block units 241a and each of the two transparent units 241b are composed of two barrier electrodes, i.e., the two block units 241a are composed of the barrier electrodes a, b, and e, f, respectively, and the two transparent units 241b are composed of the barrier electrodes c, d, and g, h, respectively. In other words, the widths of the block units 241a and the transparent units 241b of FIG. 8B are smaller than that of FIG. 8A to provide the observer in FIG. 8B a proper stereoscopic image.

Figure 8C:
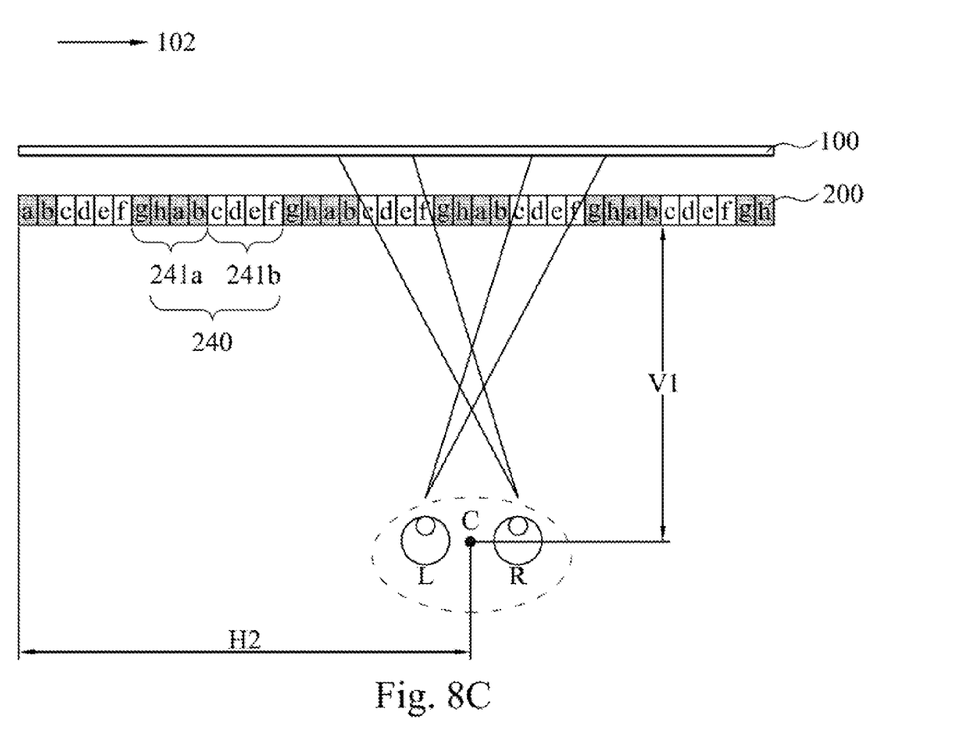
FIG. 8C is a schematic diagram of the observer located at yet another place in front of the autostereoscopic display panel of FIG. 1.

Reference is made to FIG. 8C which is a schematic diagram of the observer located at yet another place in front of the autostereoscopic display panel of FIG. 1. Firstly, the autostereoscopic display panel can detect the relative position between the two eyes L and R of the observer and the autostereoscopic display panel to get a horizontal position H2 and the vertical position V1. The horizontal position H2 is different from the horizontal position H1 in FIG. 8A. Therefore, in this embodiment, a relative displacement between vertical projections of the sub-pixels 112 (see FIG. 2A) on the barrier panel 200 and the block unit 241a and the transparent unit 241b can be determined according to the horizontal position H2. Taking FIG. 8C as an example, the block unit 241a can be composed by the barrier electrodes g, h, a, and b, and the transparent unit 241b can be composed by the barrier electrodes c~f. In other words, the block unit 241a and the transparent unit 241b of FIG. 8C both shift along the first direction 102 relative to that of FIG. 8A to provide the observer in FIG. 8C a proper stereoscopic image.

In summary, the autostereoscopic display panel can change the signals transmit to each of the barrier electrodes by detecting the place of the observer, such that the widths and/or the positions of the block unit 241a and the transparent unit 241b can be adjusted according to the place of the observer. When the number of the barrier electrodes of each of the barrier units 240 is greater, the view number of the autostereoscopic display panel is greater, and the autostereoscopic display panel can approach to nearly zero dead zones.

What is claimed is:
1. An autostereoscopic display panel, comprising:
a display panel comprising a plurality of pixel units arranged along a first direction and a second direction perpendicular to the first direction for forming a pixel unit array, each of the pixel units comprising a plurality of sub-pixels arranged along the first direction, and each of the pixel units having a pixel width along the first direction; and a barrier panel disposed adjacent to the display panel, the barrier panel comprising:

a first substrate;

a second substrate;

a liquid crystal layer disposed between the first substrate and the second substrate;

a plurality of barrier units respectively disposed between the first substrate and the liquid crystal layer, each of the barrier units comprising at least three barrier electrodes parallel to each other, each of the barrier electrodes having an electrode width along the first direction, wherein the electrode width is smaller than the pixel width;

an electrode layer disposed between the second substrate and the liquid crystal layer, and a plurality of signal sources, each of the signal sources connected to one of the barrier electrodes of each of the barrier units for providing signals to the barrier electrodes, respectively, wherein each of the barrier units has at least one block unit and at least one transparent unit, wherein the block unit and the transparent unit are alternatingly arranged, and the signal received by the block unit is different from the signal received by the transparent unit when the autostereoscopic display panel is in a stereoscopic display state;

wherein an angle is formed between an arrangement direction of the barrier electrodes and the first direction, and the angle is between 1 degree and 45 degrees.

2. The autostereoscopic display panel of claim 1, wherein each of the barrier units has a barrier width along the first direction, and the autostereoscopic display panel is designed according to the following equation:

$BW = K * PW$; and $K > 0$, wherein BW is the barrier width, K is a scan rate of the autostereoscopic display panel, and PW is the pixel width.

3. The autostereoscopic display panel of claim 1, wherein a number of the barrier electrodes of each of the block units is equal to a number of the barrier electrodes of each of the transparent units.

4. An alignment method of an autostereoscopic display panel, comprising the following steps:

adhering a display panel and a barrier panel, wherein the display panel comprises a plurality of pixel units arranged along a first direction, the barrier panel comprises a plurality of barrier units and a plurality of signal sources, each of the barrier units comprises at least three barrier electrodes, each of the signal sources connected to one of the barrier electrodes of each of the barrier units for providing signals to the barrier electrodes, respectively, wherein each of the barrier units has at least one block unit and at least one transparent unit, the block unit and the transparent unit are alternatingly arranged, and the signal received by the block unit is different from the signal received by the transparent unit when the autostereoscopic display panel is in a stereoscopic display state;

determining a position of a vertical projection of each of the pixel units on the barrier panel;

maintaining the position of the barrier units if the vertical projections overlap the barrier units; and adjusting the position of the barrier units to make the pixel units respectively overlap a block unit and a transparent unit of the barrier units if a displacement shift is formed between the vertical projections and the barrier units;

wherein the step of adhering the display panel and the barrier panel comprises the following step:

disposing the barrier panel on the display panel for forming an angle between an arrangement direction of the barrier electrodes and the first direction, wherein the angle is between 1 degree and 45 degrees.

* * * * *